(12) United States Patent
Sievert et al.

(10) Patent No.: US 11,850,973 B2
(45) Date of Patent: Dec. 26, 2023

(54) MOTOR VEHICLE SEAT

(71) Applicant: Faurecia Autositze GmbH, Stadthagen (DE)

(72) Inventors: Joshua Sievert, Wilhelmshaven (DE); Hélène L'Ebrellec, Stadthagen (DE); Dagmar Brockschnieder, Stadthagen (DE)

(73) Assignee: Faurecia Autositze GmbH, Stadthagen (DE)

( * ) Notice: Subject to any disclaimer, the term of this patent is extended or adjusted under 35 U.S.C. 154(b) by 191 days.

(21) Appl. No.: 17/411,827

(22) Filed: Aug. 25, 2021

(65) Prior Publication Data

US 2022/0063447 A1   Mar. 3, 2022

(30) Foreign Application Priority Data

Aug. 27, 2020 (DE) .................... 10 2020 122 370.6
Dec. 3, 2020 (DE) .................... 10 2020 132 212.7

(51) Int. Cl.
*B60N 2/00* (2006.01)
*G01L 1/22* (2006.01)
*G01L 5/00* (2006.01)

(52) U.S. Cl.
CPC ............ *B60N 2/002* (2013.01); *G01L 1/2206* (2013.01); *G01L 5/00* (2013.01)

(58) Field of Classification Search
CPC .......... B60N 2/002; G01L 1/2206; G01B 7/16
See application file for complete search history.

(56) References Cited

U.S. PATENT DOCUMENTS

| 2016/0265896 | A1  | 9/2016 | Ray |
| 2017/0184390 | A1  | 6/2017 | Fukuda et al. |
| 2021/0190542 | A1* | 6/2021 | Wilson ................ G01D 5/2417 |

FOREIGN PATENT DOCUMENTS

| DE | 3119806 C2 * | 11/1991 | ........... G01L 1/2206 |
| DE | 101 45 369 | 4/2003 | |
| DE | 102014014198 | 4/2015 | |

OTHER PUBLICATIONS

German Search Report dated May 17, 2021 with respect to counterpart German patent application 10 2020 132 212.7.
Translation of German Search Report dated May 17, 2021 with respect to counterpart German patent application 10 2020 132 212.7.

* cited by examiner

*Primary Examiner* — Milton Nelson, Jr.
(74) *Attorney, Agent, or Firm* — Henry M. Feiereisen LLC

(57) ABSTRACT

A motor vehicle seat includes a seat cushion, a backrest connected to the seat cushion, a headrest connected to the backrest, a padding arranged on at least one of the seat cushion, the backrest, and the headrest, and a strain gage connected to the padding and including a strain element to detect a load acting on the motor vehicle seat. The strain element is maintained mechanically under tension.

12 Claims, 5 Drawing Sheets

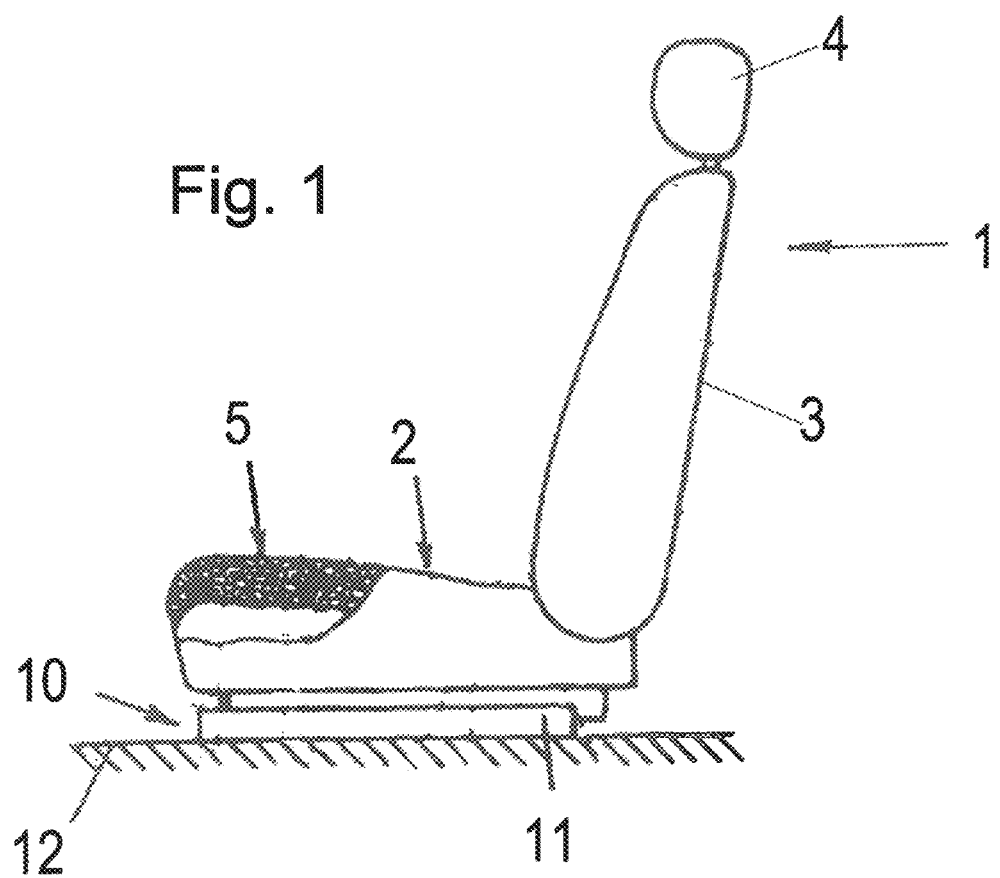

MOTOR VEHICLE SEAT

CROSS-REFERENCES TO RELATED APPLICATIONS

This application claims the priorities of German Patent Applications, Serial No. 10 2020 122 370.6, filed Aug. 27, 2020, and Ser. No. 10 2020 132 212.7, filed Dec. 3, 2020, pursuant to 35 U.S.C. 119(a)-(d), the disclosures of which are incorporated herein by reference in its entirety as if fully set forth herein.

BACKGROUND OF THE INVENTION

The present invention relates to a motor vehicle seat.

The following discussion of related art is provided to assist the reader in understanding the advantages of the invention, and is not to be construed as an admission that this related art is prior art to this invention.

Motor vehicle seats can have various sensors to detect not only seat occupation but also the posture of an occupant. To date, the sensors have shown to be unreliable and are prone to malfunction.

It would therefore be desirable and advantageous to provide an improved motor vehicle seat to obviate prior art shortcomings.

SUMMARY OF THE INVENTION

According to one aspect of the present invention, a motor vehicle seat includes a seat cushion, a backrest connected to the seat cushion, a headrest connected to the backrest, a padding arranged on at least one of the seat cushion, the backrest, and the headrest, and a strain gage connected to the padding and including a strain element to detect a bad acting on the motor vehicle seat, said strain element being maintained mechanically under tension.

The present invention resolves prior art problems by maintaining the strain element under tension. In the unloaded state, i.e. when no occupant is seated on the motor vehicle seat, the strain element is pretensioned. The length of the strain element in the unloaded state is the reference length of the strain element. As the strain element is maintained under tension, compared to a strain element that is not under tension, a hysteresis is reduced or even prevented. The term "hysteresis" as used in the description refers to a difference between the reference length of the strain element in the unloaded state before and after an occupant has occupied the motor vehicle seat. The hysteresis should be kept as low as possible in order to reduce measurement errors. Reducing the strain element hysteresis thus increases accuracy of the measured values for the magnitude and location of the force applied on the strain gage. The pretensioned strain gage in the motor vehicle seat according to the invention therefore functions more accurately than a non-pretensioned strain gage.

According to another advantageous feature of the invention, the strain element can be a flexible electrically conductive elastomer. The elastomer may, for example, be electrically conductive on account of the use of graphite. Conductive elastomers of this kind are cost-effective, robust, and can be incorporated as continuous threads into a textile.

According to another advantageous feature of the invention, the strain gage can include a plurality of strain elements. Advantageously, the strain elements have a linear configuration. A large number of strain elements are advantageous for detecting a loading of the motor vehicle seat. The loading due to the application of a force can be detected more accurately, and it is possible to determine the location at which the force is applied within a larger area.

According to another advantageous feature of the invention, the strain elements can be arranged in a flat arrangement and/or in a grid pattern. Advantageously, the strain elements are arranged in the regions of the motor vehicle seat in which loading of the motor vehicle seat by an occupant is to be expected, e.g. on the seat cushion, backrest, and headrest. A flat arrangement of the strain elements, which may be additionally arranged in a grid pattern, i.e. they intersect, is particularly advantageous for detecting the magnitude and location of a force applied by an occupant.

According to another advantageous feature of the invention, provision may be made for a securing element to secure the strain gage in place and to maintain a pretensioned state of the strain gage. The securing element may advantageously be an existing component of the motor vehicle seat, e.g. a height adjuster of a headrest. The strain gage can be fastened to the securing element by means of gluing, welding, or screwing, for example.

According to another advantageous feature of the invention, the securing element may be designed to be non-flexible, i.e. rigid. In order to maintain the pretensioned state of the flexible strain gage, the securing element must be non-flexible. The reference length of the strain gage is thus preserved in the unloaded state.

According to another advantageous feature of the invention, the strain element can be arranged between two securing elements. The flexible strain gage is secured between the two substantially opposing securing elements and thus pretensioned in the unloaded state.

According to another advantageous feature of the invention, the strain gage can be arranged on the padding. Arranging the strain gage on the padding is a simple and cost-effective measure, and the strain gage is protected by an additional cover that typically covers a seat of a motor vehicle. Since there is no force-absorbing padding, a force applied on the strain gage by an occupant can be detected and located more accurately.

According to another advantageous feature of the invention, the strain gage can be arranged in the padding. In this way, the strain gage is particularly well protected against damage, e.g. caused by moisture. Moreover, the strain gage is not noticeable to an occupant and is therefore particularly comfortable.

According to another aspect of the invention, a method for detecting a malfunction of a strain gage of a motor vehicle seat includes applying an electrical voltage to the strain gage, detecting an electrical current conducted by the strain gage, and comparing the detected electrical current with a stored value for an electrical current.

A method according to the invention has the advantage that structural changes to the strain gage and/or strain elements can be detected and thus a malfunction of the strain sensor and/or strain element can be detected. When an error is identified, an error report is issued.

The stored value for the electrical current is recorded by a brand-new, unloaded strain gage and constitutes the reference value for the change in length of the strain gage and thus for the measurement of the force acting on the strain gage. Damage to the strain gage and/or an individual strain element or multiple strain elements can result in a permanent change in length.

Advantageously, a method according to the invention is carried out continuously because as the strain gage is maintained under tension, damage may also be possible in an unloaded state of the motor vehicle seat, i.e. when no occupant is sitting on the motor vehicle seat.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a schematic view of a motor vehicle seat having incorporated therein the subject matter according to the invention;

DETAILED DESCRIPTION OF PREFERRED EMBODIMENTS

Figure 1A:
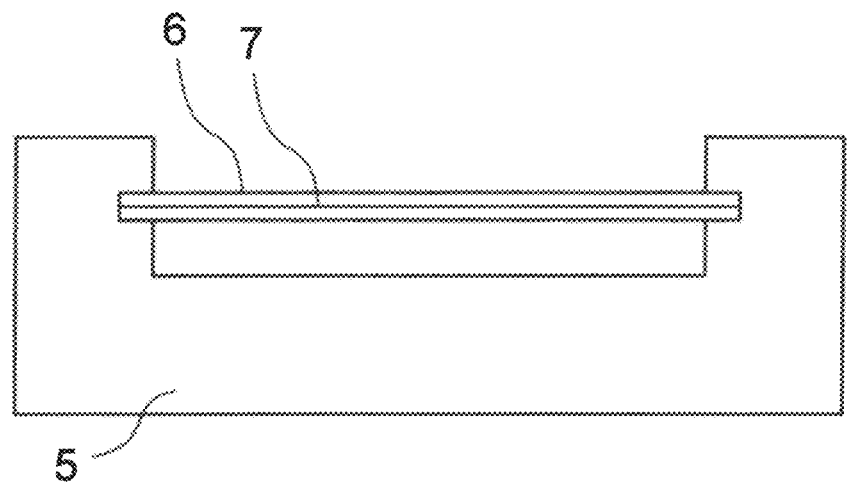
FIG. 1a is a schematic sectional view of a first exemplary embodiment of a motor vehicle seat according to the invention in an unloaded state.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic view of a motor vehicle seat, generally designated by reference numeral 1 and mounted via a base 10 and rails 11 to a floor 12 of a motor vehicle. The motor vehicle seat 1 includes a seat cushion 2, a backrest 3, and a headrest 4. The motor vehicle seat 1 includes padding 5, which covers each of the aforementioned components and is typically a yielding foamed polymer.

As shown by way of example in FIG. 1a, which depicts a schematic sectional view of a first exemplary embodiment of the motor vehicle seat 1 according to the invention, a strain gage 6 is arranged in the padding 5 of the backrest 3 and includes as strain elements a plurality of pressure elements 7 which are arranged in parallel. As FIG. 1a is a sectional view in a plane perpendicular to the strain gage 6, only one pressure element 7 is visible here/. The strain gage 6 is designed as a two-dimensional mat with the parallel arrangement of the pressure elements 7.

Figure 1B:
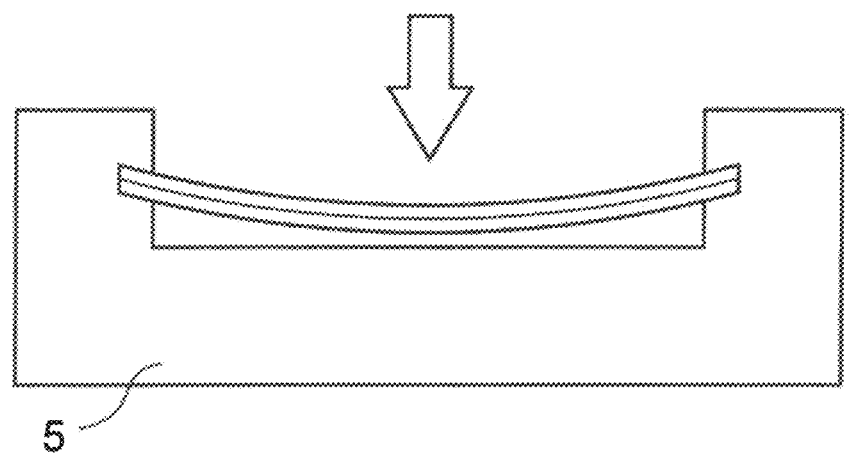
FIG. 1b is a schematic sectional view of the motor vehicle seat in a loaded state.

In order to prevent damage, the strain gage 6 is protected by a flexible cover (not shown) that is arranged between an occupant and the strain gage 6. The lateral edges of the strain gage 6 are not designed to be resilient and thus rigid so as to retain their shape during loading of the strain gage 6, as indicated in FIG. 1b by the arrow. The lateral edges of the strain gage 6 have electrically conductive contacts which are connected to a power supply and a control apparatus (not shown). The lateral edges are secured in securing elements 8 that are arranged in the padding 5 and shown by way of example in FIGS. 3a and 3b. The strain gage 6 is maintained mechanically under tension or pretensioned by the securing elements 8 such that the strain gage 6 has in the unloaded state a reference length which is at a minimum, i.e., during loading by an occupant, the pressure elements 7, on which a force acts, are elongated.

A method for detecting a malfunction of the strain gage 6 involves three method steps. In a first method step, an electrical voltage is applied to the strain gage 6. In a second method step, the current conducted by the strain gage 6 is detected. In a third method step, the detected current is compared with a stored current for an intact strain gage 6. Advantageously, as the strain gage 6 is maintained under tension, a faulty strain gage 6 can also be identified in the unloaded state of the motor vehicle seat 1.

Figure 2:
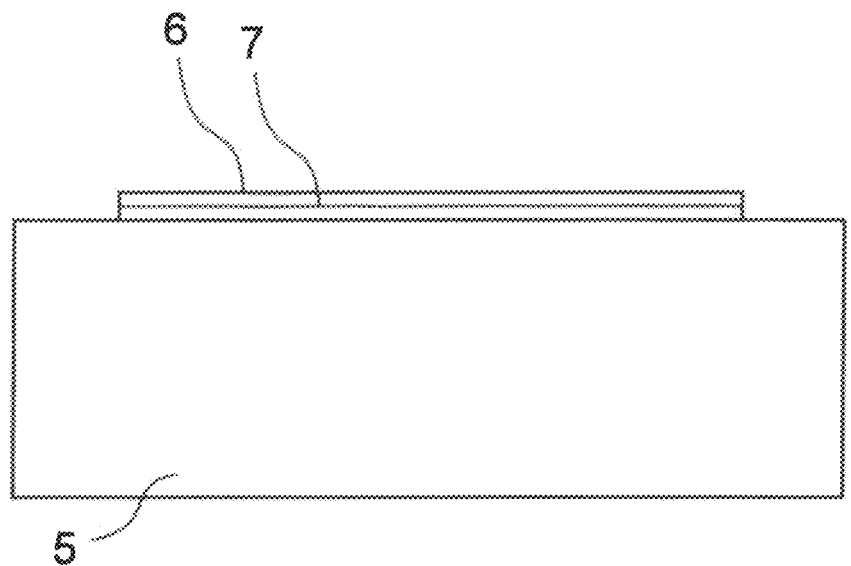
FIG. 2a is a schematic sectional view of a second exemplary embodiment of a motor vehicle seat according to the invention in an unloaded state.
FIG. 2b is a schematic sectional view of the motor vehicle seat of FIG. 2a in a loaded state.
Figure 2:
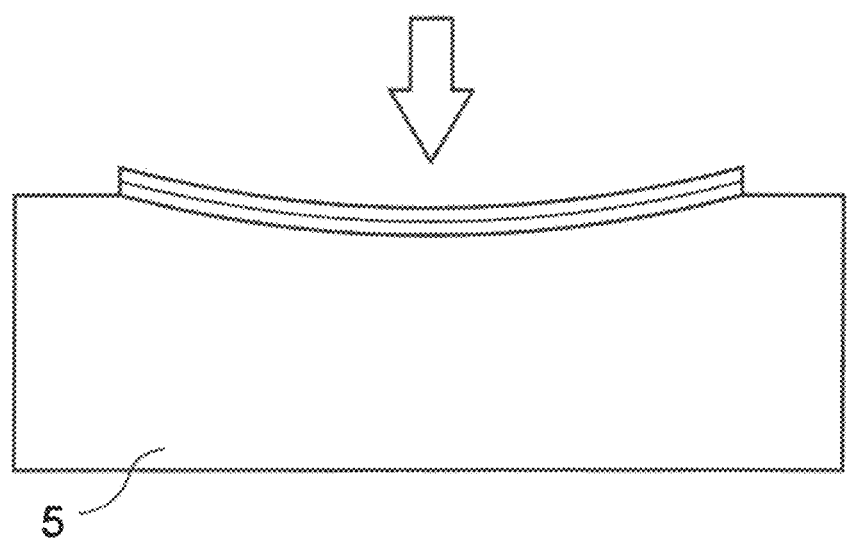

FIGS. 2a and 2b show sectional views of a second exemplary embodiment of the motor vehicle seat 1 according to the invention in an unloaded state and a loaded state, respectively. Parts corresponding with those in FIGS. 1a, 1b are denoted by identical reference numerals and not explained again. In this embodiment, the strain gage 6 is arranged on the padding 5 of the seat cushion 2 (FIG. 2a). FIG. 2a again depicts only one pressure element 7, when in fact the strain gage 6 has a plurality of pressure elements 7 in parallel arrangement. The strain gage 6 is designed as a two-dimensional mat with the pressure elements 7.

In order to prevent damage, the strain gage 6 is protected by a flexible cover (not shown) that is arranged between the occupant and the strain gage 6. The lateral edges of the strain gage 6 are not designed to be resilient, and they therefore retain their shape during loading of the strain gage (FIG. 2b). The lateral edges comprise electrically conductive contacts that are connected to a power supply and a control apparatus (not shown). The lateral edges are secured in securing elements 8 that are arranged in the padding. The strain gage 6 is held in a pretensioned state by the securing elements 8 such that the strain gage 6 has a reference length in the unloaded state.

A method for detecting a malfunction of the strain gage 6 involves three method steps. In a first method step, an electrical voltage is applied to the strain gage 6. In a second method step, the current conducted by the strain gage 6 is detected. In a third method step, the detected current is compared with a stored current for an intact strain gage 6. Advantageously, as the strain gage 6 is maintained under tension, a faulty strain gage 6 can also be identified in the unloaded state of the motor vehicle seat 1.

Figure 3:
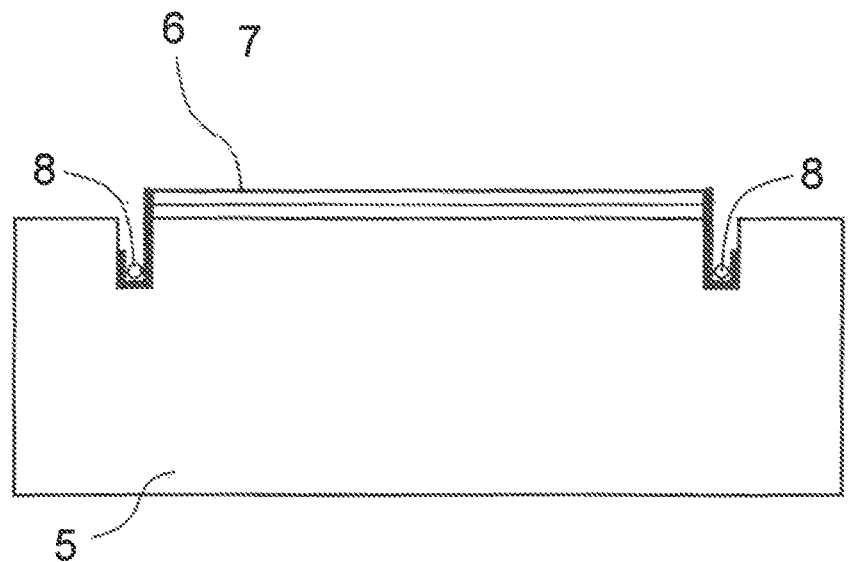
FIG. 3a is a schematic sectional view of a third exemplary embodiment of a motor vehicle seat according to the invention in an unloaded state.
FIG. 3b is a schematic sectional view of the motor vehicle seat of FIG. 3a in a loaded state.
Figure 3:
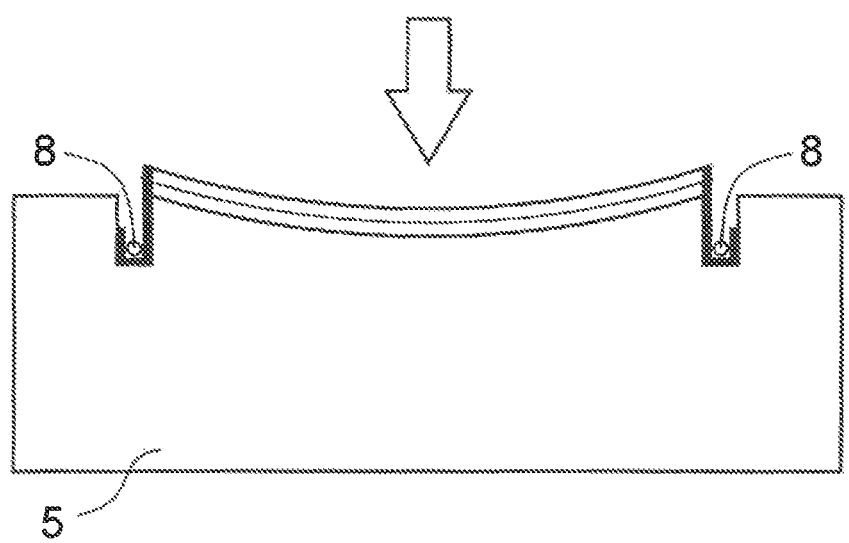

FIGS. 3a and 3b show sectional views of a third exemplary embodiment of a motor vehicle seat 1 according to the invention in an unloaded state and a loaded state, respectively, Parts corresponding with those in FIGS. 1a, 1b are denoted by identical reference numerals and not explained again. In this embodiment, the strain gage 6 is arranged on the padding 5 of the headrest 4 (FIG. 3a) and involves a two-dimensional mat having parallel pressure elements 7 (only one is shown in FIG. 3a).

In order to prevent damage, the strain gage 6 is protected by a flexible cover (not shown) that is arranged between the occupant and the strain gage 6. The lateral edges of the strain gage 6 are not designed to be resilient, and they therefore retain their shape during loading of the strain gage 6 (FIG. 3b). The lateral edges include electrically conductive contacts that are connected to a power supply and a control apparatus (not shown). The lateral edges are secured in securing elements 8 that are arranged in the padding 5. The strain gage 6 is held in a pretensioned state by the securing elements 8 such that the strain gage 6 has a reference length in the unloaded state.

A method for detecting a malfunction of the strain gage 6 involves three method steps. In a first method step, an electrical voltage is applied to the strain gage 6. In a second method step, the current conducted by the strain gage 6 is detected. In a third method step, the detected current is compared with a stored current for an intact strain gage 6. Advantageously, as the strain gage 6 is maintained under tension, a faulty strain gage 6 can also be identified in the unloaded state of the motor vehicle seat 1.

Figure 4:
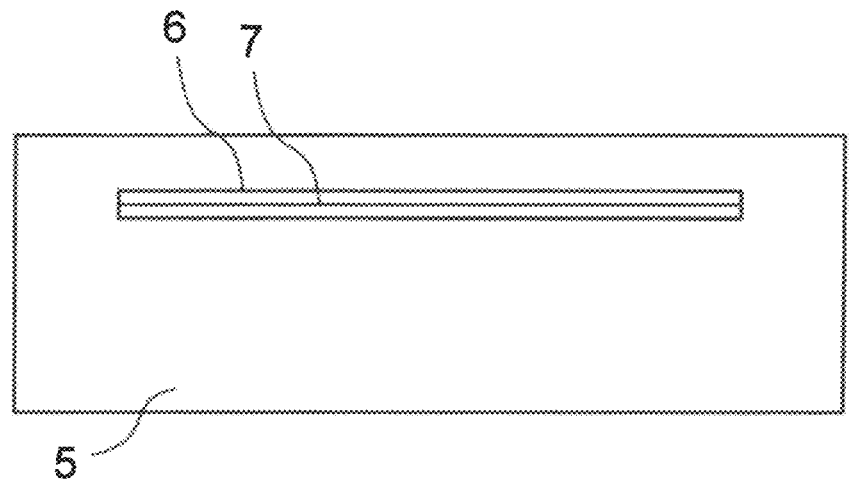
FIG. 4a is a schematic sectional view of a fourth exemplary embodiment of a motor vehicle seat according to the invention in an unloaded state.
FIG. 4b is a schematic sectional view of the motor vehicle seat of FIG. 4a in a loaded state.
Figure 4:
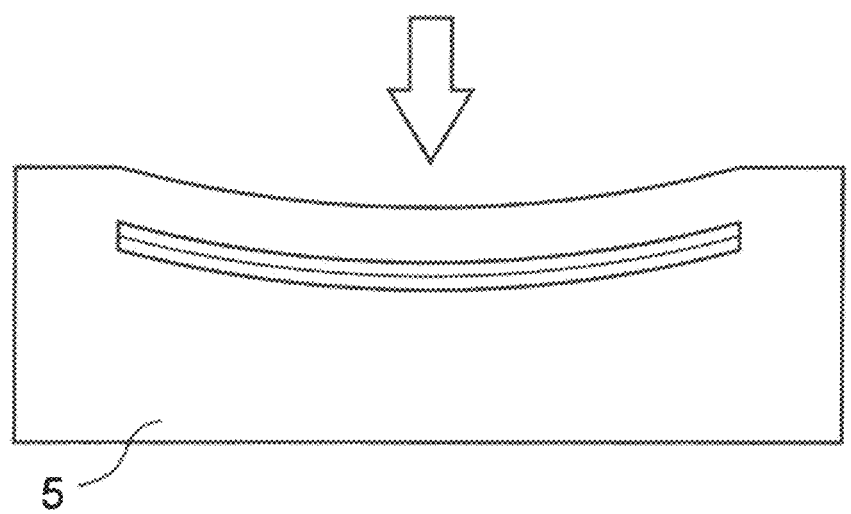

FIGS. 4a and 4b show sectional views of a fourth exemplary embodiment of a motor vehicle seat 1 in an unloaded state and a loaded state, respectively. Parts corresponding with those in FIGS. 1a, 1b are denoted by identical reference numerals and not explained again. In this embodiment, the strain gage 6 is arranged inside the padding 5 of the seat cushion 2 (FIG. 4a) and involves a two-dimensional mat having parallel pressure elements 7 (only one is shown in FIG. 4a).

The lateral edges of the strain gage 6 are not designed to be resilient, and they therefore retain their shape during loading of the strain gage 6 (FIG. 4b). The lateral edges include electrically conductive contacts that are connected to a power supply and a control apparatus (not shown). The lateral edges are secured in securing elements 8 that are arranged in the padding 5. The strain gage 6 is held in a pretensioned state by the securing elements 8 such that the strain gage 6 has a reference length in the unloaded state.

A method for detecting a malfunction of the strain gage 6 involves three method steps. In a first method step, an electrical voltage is applied to the strain gage 6. In a second method step, the current conducted by the strain gage 6 is detected. In a third method step, the detected current is compared with a stored current for an intact strain gage 6. Advantageously, as the strain gage 6 is maintained under tension, a faulty strain gage 6 can also be identified in the unloaded state of the motor vehicle seat 1.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A motor vehicle seat, comprising:
    a seat cushion;
    a backrest connected to the seat cushion;
    a headrest connected to the backrest;
    a padding arranged on at least one of the seat cushion, the backrest, and the headrest; and
    a strain gage connected to the padding and including a strain element to detect a load acting on the motor vehicle seat, said strain element being maintained mechanically under tension.

2. The motor vehicle seat of claim 1, wherein the strain element is an electrically conductive elastomer.

3. The motor vehicle seat of claim 1, wherein the strain gage comprises a plurality of said strain element.

4. The motor vehicle seat of claim 3, wherein the strain elements have a linear configuration.

5. The motor vehicle seat of claim 3, wherein the strain elements are arranged in a flat arrangement.

6. The motor vehicle seat of claim 3, wherein the strain elements are arranged in a grid pattern.

7. The motor vehicle seat of claim 1, further comprising a securing element to secure the strain gage and to maintain the strain gage mechanically under tension.

8. The motor vehicle seat of claim 7, wherein the strain gage is fastened to the securing element by gluing, welding, or screwing.

9. The motor vehicle seat of claim 1, further comprising a seat frame, said strain gage being arranged on the seat frame.

10. The motor vehicle seat of claim 1, wherein the strain gage has an edge which is rigid.

11. The motor vehicle seat of claim 1, wherein the strain gage is arranged in the padding.

12. The motor vehicle seat of claim 1, wherein the strain gage is arranged on the padding.

* * * * *